Oct. 11, 1955 H. O. SIMROSE 2,720,147
TOOL SUPPORTING MECHANISM
Filed April 2, 1954 2 Sheets-Sheet 1

INVENTOR
HERMAN O. SIMROSE

BY *Ralph B Burch*

ATTORNEY

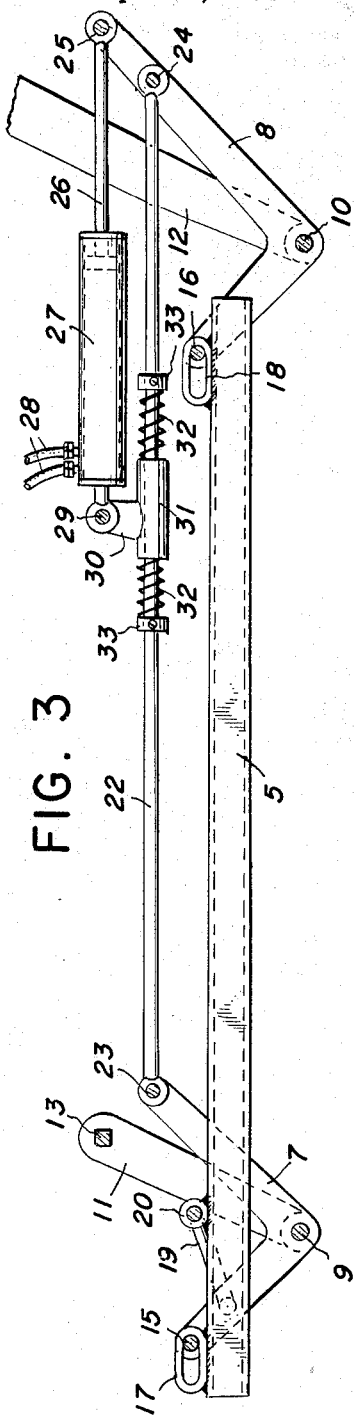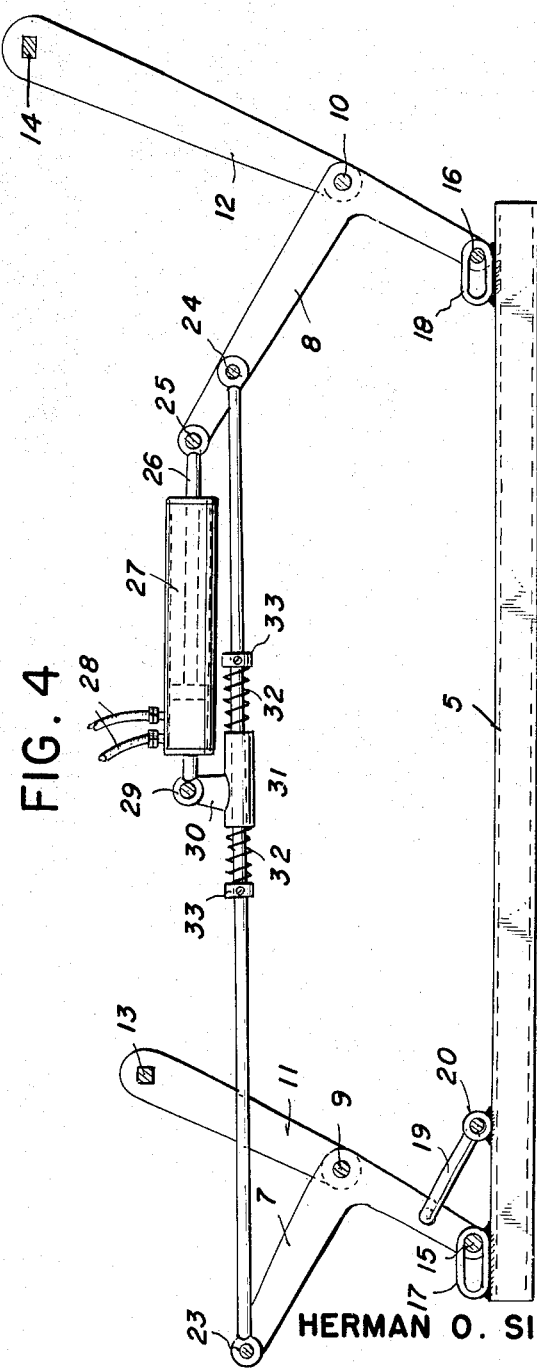

United States Patent Office 2,720,147
Patented Oct. 11, 1955

2,720,147

TOOL SUPPORTING MECHANISM

Herman O. Simrose, Darmody, Saskatchewan, Canada

Application April 2, 1954, Serial No. 420,648

2 Claims. (Cl. 97—46.59)

This invention relates to tool supporting mechanism for tractors.

Briefly, the invention consists of a pair of tool supporting bars suspended from opposite sides of a tractor by suitable linkage operated by hydraulic cylinders to raise and lower the tool supporting bars.

It is an object of the invention to provide suspension means for a pair of tool supporting bars actuated by hydraulic cylinders to raise or lower the tool supporting bars simultaneously or independently of each other.

A further object of the invention resides in pivotally suspending a pair of tool supporting bars from a tractor, the suspension means being operable by a reciprocating rod to raise and lower the supporting bar, said reciprocating rod being actuated by hydraulic cylinders connected to the reciprocating rod by a yieldable connection.

Other objects and advantages of the invention will be apparent during the course of the following description.

This application is a continuation-in-part of my prior application filed September 28, 1951, Serial No. 248,810, now abandoned.

Figure 1:
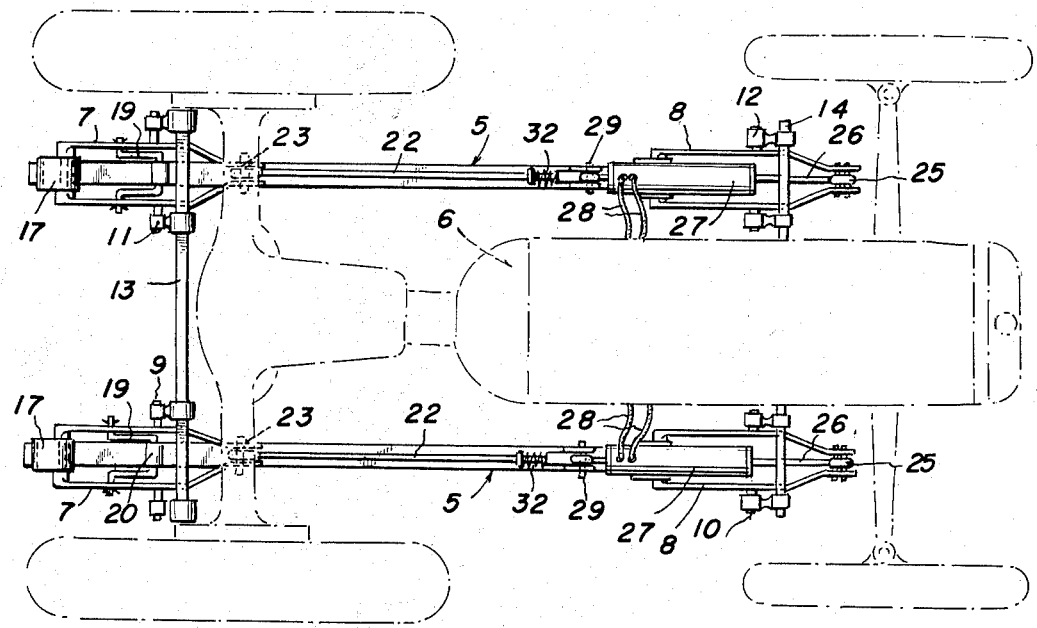
Figure 2:
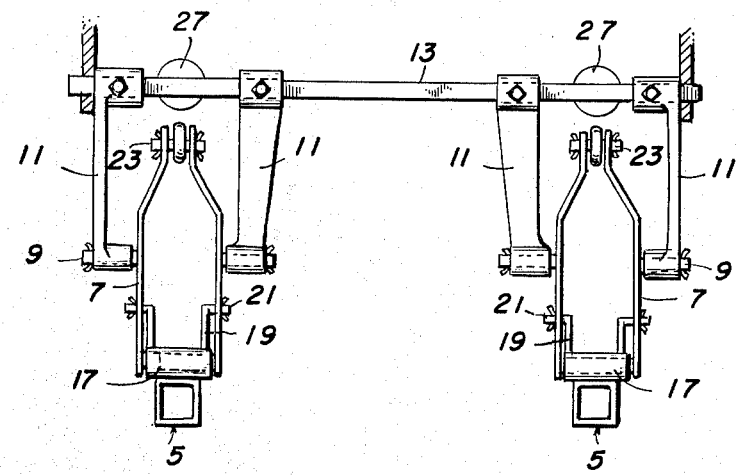

In the accompanying drawings, forming a part of this specification and in which like numerals are employed to designate like parts throughout the same, Fig. 1 is a top plan view of the invention, Fig. 2 is an end view of the same, Fig. 3 is a side elevational view showing the tool supporting bar in a raised position, and, Fig. 4 is a view similar to Fig. 3, showing the tool supporting bar in lowered position.

Referring to the drawing wherein for the purpose of illustration a preferred embodiment of the invention is shown the numeral 5 denotes a tool supporting bar of tubular construction and which is square shape in cross section. There are two of the bars 5 suspended from opposite sides of a tractor 6, shown in dotted lines in Fig. 1, and since the suspension means for each of the bars is the same the description of one will suffice. The bar 5 extends longitudinally of the tractor and is suspended from the tractor frame at each end by a pair of bell crank levers 7 and 8. Each pair of levers are provided with laterally projecting fulcrum pins 9 and 10, journaled in bearings at the lower ends of hangers 11 and 12 suspended from and fixedly mounted on rods 13 and 14 extending transversely of the tractor frame. The short arms of levers 7 and 8 are connected together by bolts 15 and 16 which are slidably mounted in elongated links 17 and 18 mounted on top of the bar 5. The levers 7 are connected in fixed relation to the bar 5 by a U-shaped shackle 19 journaled in a bearing 20 attached to the top of bar 5 rearwardly of the link 17. The arms of the shackle have their ends 21 bent outwardly and pivotally mounted in the short arms of levers 7.

A connecting rod 22 extends between the levers 7 and 8 and at one end is pivotally mounted between the ends of the long arms of levers 7, as at 23, and at its opposite end is pivotally mounted between the long arms of levers 8, as at 24. The long arms of levers 8 extend beyond the pivot 24 and are pivotally connected, as at 25, to the piston rod 26 of a hydraulic cylinder 27 connected by conduits 28 to a source of hydraulic fluid. The cylinder 27 is pivotally connected at 29 to an arm 30 extending from a sleeve 31 slidably mounted on connecting rod 22 and mounted on the rod 22 on opposite sides of the sleeve are compression springs 32 held in bearing engagement with the sleeve by collars 33 adjustably mounted on the rod 22.

In operation the tillage tools are connected to the underside of the bars 5 by clamps or other suitable attaching means. When the levers 7 and 8 are in the position shown in Fig. 4 the bars supporting the tillage tools are in lowered or operative position. To raise the tool bars to an inoperative position hydraulic fluid is admitted to cylinder 27 to extend the piston rod 26 which rocks the lever 8 and through the connecting rod 22 the movement of lever 8 is transmitted to lever 7 so that the levers assume the position in Fig. 3 which raises the tool bars to an inoperative position.

It is to be understood that the form of my invention herein shown and described is to be taken as a preferred example of the same and changes in the shape, size and arrangement of the parts may be made without departing from the spirit of the invention or scope of the claims.

Having thus described my invention, I claim:

1. Mechanism for raising and lowering the tool holding bar of a tractor comprising a pair of bell crank levers pivotally and slidably connected at one end to opposite ends of the tool holding bar, means pivotally mounting said levers on the tractor frame, a connecting rod extending between and pivotally connected to the other arms of said levers, a sleeve slidably mounted on said connecting rod, compression springs mounted on said rod on opposite sides of said sleeve, a hydraulic cylinder pivotally connected at one end to said sleeve, and a piston rod extending from the other end of said cylinder pivotally connected to an arm of one of said levers.

2. Mechanism for raising and lowering the tool holding bar of a tractor comprising a pair of bell crank levers pivotally mounted on the frame of the tractor and having long and short arms, means slidably and pivotally connecting the short arms of said levers to opposite ends of the tool holding bar, a connecting rod extending between and pivotally connected to the long arms of said levers, a sleeve slidably mounted on said connecting rod, collars adjustably mounted on said rod on opposite sides of said sleeve, compression springs mounted on said rod between said sleeve and said collars, a hydraulic cylinder pivotally connected at one end to said sleeve, and a piston rod extending from the other end of said cylinder pivotally connected to the long arm of one of said bell crank levers.

References Cited in the file of this patent

UNITED STATES PATENTS

| | | |
|---|---|---|
| 983,523 | Walker | Feb. 7, 1911 |
| 1,007,459 | Larsen | Oct. 31, 1911 |
| 2,368,312 | Luger | Jan. 30, 1945 |
| 2,593,028 | Hendrick | Apr. 15, 1952 |
| 2,674,168 | Blaydes | Apr. 6, 1954 |